A. WAGSTAFF, Jr.
RADIATOR SHIELD FOR AUTOMOBILES.
APPLICATION FILED FEB. 24, 1915.
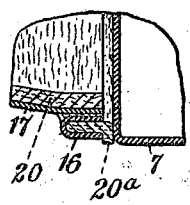
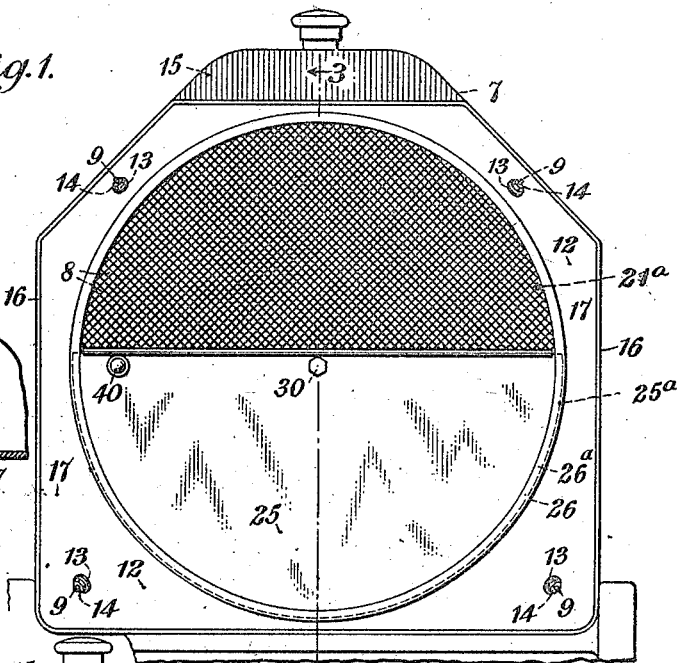
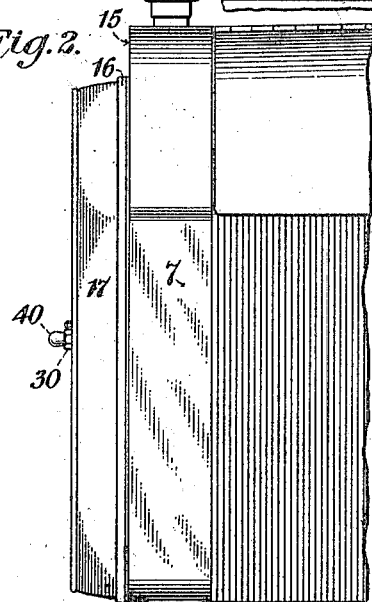
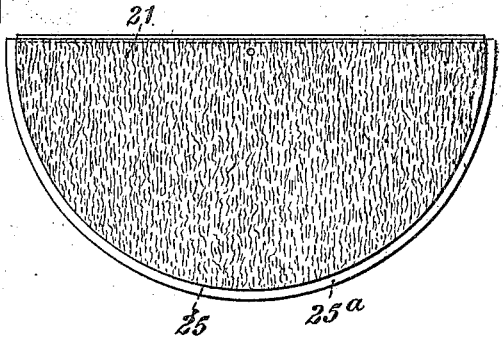

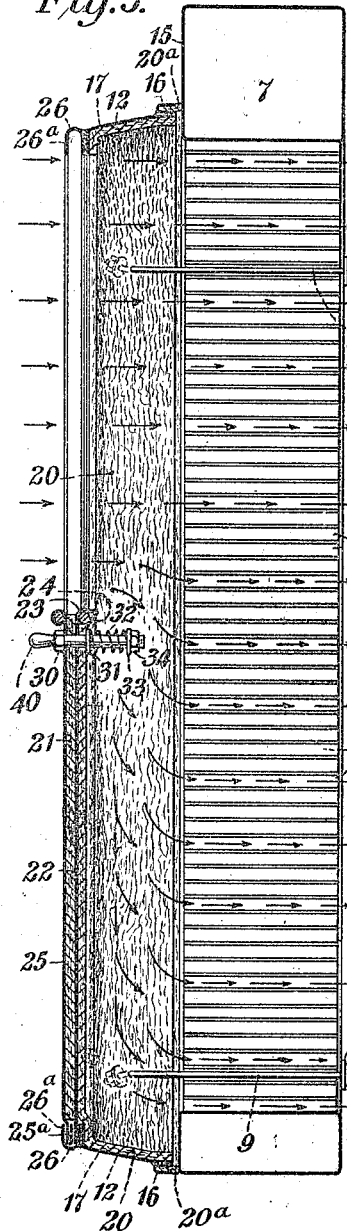
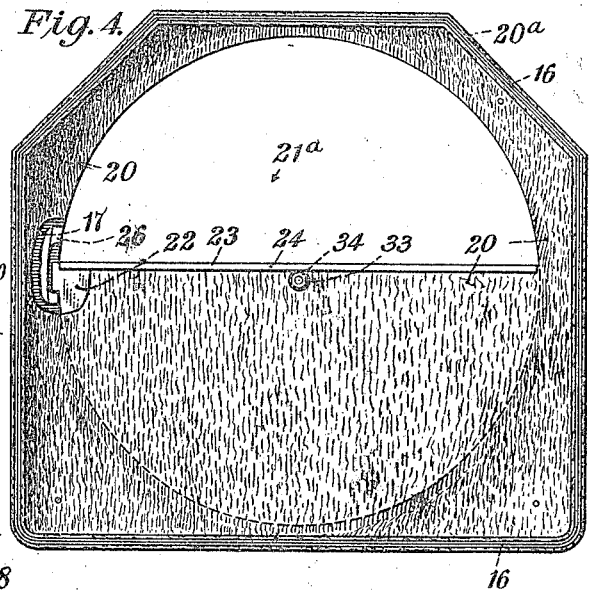
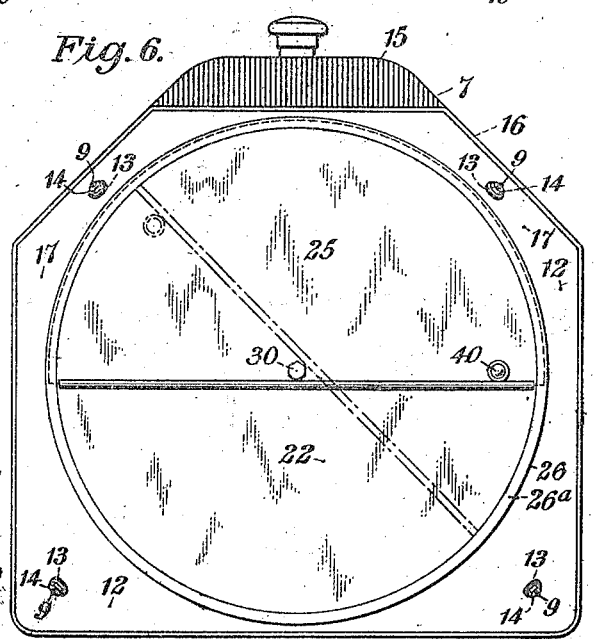

UNITED STATES PATENT OFFICE.

ALFRED WAGSTAFF, JR., OF NEW YORK, N. Y.

RADIATOR-SHIELD FOR AUTOMOBILES.

1,239,144.  Specification of Letters Patent.  Patented Sept. 4, 1917.

Application filed February 24, 1915. Serial No. 10,279.

*To all whom it may concern:*

Be it known that I, ALFRED WAGSTAFF, Jr., residing at 24 East 54th St., New York city, N. Y., and being a citizen of the United States, have invented certain new and useful Improvements in Radiator-Shields for Automobiles, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings:

Figure 1 is a front elevational view showing my invention in service position and wholly open.

Fig. 2 is a side elevational view of a fragment of an automobile hood equipped with my invention.

Fig. 3 is a vertical sectional view, the section being taken on line 3—3 of Fig. 1.

Fig. 4 is a rear elevational or interior view of my invention with the opening, hereinafter referred to, wholly uncovered, the view showing a detail in fragmentary section.

Fig. 5 is a detached detail rear elevational view of the closure for the opening disclosed in Fig. 4.

Fig. 6 is a view similar to Fig. 1, except that the shield is wholly closed so as to afford the maximum protection to the automobile radiator.

Fig. 7 is an enlarged detail hereinafter described.

One of the objects of the invention is to protect the front face of an automobile radiator against inclement weather. Another object is to provide a zone of relatively warm air contiguous the lower portion of such radiator and lying in the path of inrushing air, so that such inrushing air will of necessity be partially warmed before it passes through the radiator, thereby preventing too sudden cooling of the radiator and its contained fluid, whether water or any suitable mixture, with which the radiator may be filled, and also preventing undue cooling of the motor, carbureter, etc., of the automobile.

Other features of general novelty and advantage will be hereinafter pointed out in connection with the detail description of the parts.

In devices of this kind it is essential that suitable adjustment may be made to accommodate the device to different temperatures.

It is also essential to the perfection of operation to so position and proportion the parts that there is ample room for currents of air to pass through the entire radiator. As the lower part of the radiator is liable—especially in very cold weather—to be cooler than the upper part, it is desirable to pass the air which is to travel through the lower part of the radiator over or against the surface of its warmer parts, thereby partially heating such air before it is permitted to pass through the radiator to the rear thereof.

Referring specifically to the parts 7 indicates generally what is known as a "honeycomb" radiator commonly used in automobile construction, said radiator comprising relatively small fluid passages spaced apart by series of air passages 8 through the radiator from front to rear. 9 indicates rods or long bolts which extend through the passages 8, before referred to, being secured in position at their inner ends by nuts or heads 10 bearing against plates or washers 11, which plates or washers are larger than the openings 8.

Secured in position by the bolts 9 is a suitable frame 12, through perforations in which pass such bolts, while washers 13 and nuts or bolt heads 14, bearing on the washers, secure the frame 12 rigidly in position against the front face of the radiator, the frame 12 preferably being of such size and shape as to register in outline with the contour of the lower part of the radiator.

For obvious reasons the space 15, commonly occupied by the maker's name plate is not intended to be covered.

The frame 12 may comprise a perimeter 16, raised as shown in Fig. 3, to which is secured by solder, brazing or any suitable means, a raised extension 17 of metal, or the parts 16 and 17 may be integrally formed as may be desired.

Shaped to and intimately connected with the outstanding part 17 of the frame is an insulating lining 20 which, as shown in Fig. 4, is preferably formed from a single sheet of material from which, within the marginal portion, is cut a semi-circular fragment 21, which latter is shown secured to the inner face of the slide or closure in Fig. 5.

The lining 20 is secured in any suitable manner and extends throughout the entire inner face of the stationary and movable parts of the shield, being held along the upper edge 23 of the fixed shield by means of a return bent flange 24 of the metal forming the part 22 of the shield, the flange 24 closely gripping the felt or other insulation employed, as shown in Fig. 3, thereby supporting the insulation against accidental displacement and insuring an unobstructed passage for air currents to the lower interior part of the shield between the shield part 22 and the lower part of the radiator, from which the part 22 is spaced by the outstanding portion 17, before indicated.

For ordinary winter driving, the stationary parts of the shield are sufficient.

However, it is well known that the upper part of the radiator will cool quickly, when left exposed, while the car is standing, and to prevent such cooling it is desirable to close the opening 21ª.

To accomplish this, the closure 25 is pivotally mounted in position so that it may be swung on its pivot to wholly or partly close the opening 21ª.

Surrounding the shield part 22 and opening 21ª is a channel shaped annulus 26, with its flanges 26ª directed inwardly, thereby forming a guide and retainer for the movable closure 25.

Resting in the annulus 26 is a refolded edge portion 25ª of the closure 25, said edge portion preferably being continuous throughout the curved edge portion of the closure, said edge portion projecting outwardly beyond the insulation 21, before indicated, and thereby providing a metallic guide for the closure during movement thereof, as well as a retaining edge binding strip coöperating with the annulus 26, to hold the closure in position.

The insulation is preferably disposed on the inner face of the closure and the closure positioned externally of the fixed parts of the shield so as to facilitate repairs in the event that repairs are necessary.

To serve as a pivot for the swinging closure 25, a bolt 30 is provided, the head of such bolt resting against the outer face of the closure, while the stem of the bolt passes through coincident perforations in the closure and the part 22 of the shield, a washer 31, resting against the insulation on the inner face of the latter, a spring 32 resting against the washer and a washer 33 and a screw threaded nut 34 bearing against the inner end of the spring so as to regulate the tension of the spring and incidentally prevent rattling of the parts while the automobile is running.

The fragmentary broken parts of Fig. 4 and the enlarged details of Fig. 3, show the interlocked relation of the closure 25 and the annular channel 26, from which it will be evident that, with the spring 32 properly tensioned, the closure 25 will be held in any position to which it may be moved by means of the operating knob 40, which is provided for that purpose.

With the parts formed and disposed, as hereinbefore indicated, a greater or less volume of air may be admitted to the interior of the shield and a correspondingly less or greater volume of heated air may be retained between the radiator and the shield as may be found necessary to partially heat the incoming air prior to its passage through the lower part of the radiator.

With the present tendency to place carbureters for internal combustion engines used in automobiles near the motor and within the lower part of the hood, it is common practice when driving in cold weather to cover the lower part of the radiator with a closely fitting device of some sort to protect the carbureter, but such devices practically destroy the usefulness of the lower part of the radiator, while with the present invention, the entire radiator is in service to perform its ordinary function, but its lower part is always protected by a zone of heated air which necessarily raises the temperature of air passing through the shield opening to the carbureter.

It is obvious that if the carbureter is positioned above the horizontal diameter of the annulus 26, the fixed part 22 may be at the top and the closure open and close an opening corresponding to the opening 21ª at the bottom.

Referring specifically to Fig. 7, it will be noted that the metal forming the perimeter 16 is folded back upon itself and grips between its parallel folds a strip 20ª of felt, or other suitable packing, which latter extends inwardly into contact with the front face of the radiator 7, the packing extending beyond the metal sufficiently to insure good contact to shut out air, which might otherwise leak through between the edge position of the shield and the radiator.

The portion of frame 12 which surrounds the outstanding flange 17 is adapted to rest, with its insulated lining, in surface contact with the front face of an automobile radiator, as shown in Figs. 1 and 6 and the face of the shield within the flanges 17, as at 22, extends parallel with but at a relatively considerable distance away from the front of the radiator as illustrated in Fig. 3, thereby forming, with the radiator, a hot air pocket open only at the top as illustrated in Fig. 3.

What I claim is:

In combination in a radiator shield for automobiles, a frame portion adapted to be connected with such radiators said frame portion including an outstanding fixed portion adapted to be held a substantial distance away from such radiator, an insulating lining covering substantially the entire inner face of said shield, a pivotally supported movable portion, a pivot connecting the fixed and movable portions and a channel-shaped annulus on the fixed portion inclosing an edge portion of the movable portion and adapted to serve as a guide for said movable portion during rotation thereof on said pivot.

In witness whereof I have hereunto set my hand in the presence of two witnesses.

ALFRED WAGSTAFF, Jr.

Witnesses:
 Ed. McCann,
 John A. Gallagher.